(12) United States Patent
Iwase et al.

(10) Patent No.: US 8,043,527 B2
(45) Date of Patent: Oct. 25, 2011

(54) LIQUID CRYSTALLINE POLYESTER RESIN COMPOSITION AND MOLDED ARTICLE THEREOF

(75) Inventors: Sadanobu Iwase, Tsuchiura (JP); Mitsuo Maeda, Tsukuba (JP); Hiroshi Harada, Tsukuba (JP); Yusaku Kohinata, Tokyo (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 12/720,225

(22) Filed: Mar. 9, 2010

(65) Prior Publication Data

US 2010/0230637 A1 Sep. 16, 2010

(30) Foreign Application Priority Data

Mar. 11, 2009 (JP) ................................. 2009-057574
Jun. 29, 2009 (JP) ................................. 2009-153518

(51) Int. Cl.
*C09K 19/38* (2006.01)
*C09K 19/20* (2006.01)
*C09K 19/54* (2006.01)
*G11B 7/24* (2006.01)
*C08J 5/00* (2006.01)

(52) U.S. Cl. ................................. 252/299.67; 252/299.5
(58) Field of Classification Search ............. 252/299.01, 252/299.5, 299.67; 428/480; 369/112.01; 106/409, 415

See application file for complete search history.

(56) References Cited

U.S. PATENT DOCUMENTS

| 7,014,921 | B2 * | 3/2006 | Okamoto et al. | 428/480 |
| 7,790,786 | B2 * | 9/2010 | Murouchi et al. | 523/219 |
| 2001/0012862 | A1 | 8/2001 | Maeda | |
| 2006/0047100 | A1 * | 3/2006 | Murouchi et al. | 528/272 |
| 2007/0173565 | A1 | 7/2007 | Murouchi et al. | |
| 2008/0176048 | A1 * | 7/2008 | Onizawa et al. | 428/195.1 |

FOREIGN PATENT DOCUMENTS

JP 2001-067702 A 3/2001

* cited by examiner

*Primary Examiner* — Shean Wu
(74) *Attorney, Agent, or Firm* — Panitch Schwarze Belisario & Nadel LLP

(57) ABSTRACT

The present invention provides a liquid crystalline polyester resin composition suitable for an optical pickup unit. The composition comprises a liquid crystalline polyester, a mica and a hollow filler. Using the liquid crystalline polyester resin composition, an optical pickup unit with a high soldering resistance and a high torsional elastic modulus can be produced while suppressing breakage of the hollow filler in the composition.

7 Claims, 1 Drawing Sheet

LIQUID CRYSTALLINE POLYESTER RESIN COMPOSITION AND MOLDED ARTICLE THEREOF

BACKGROUND OF THE INVENTION

1. Field of the Invention

The present invention relates to a liquid crystalline polyester resin composition containing a liquid crystalline polyester and a filler, and a molded article thereof. More particularly, the present invention relates to a liquid crystalline polyester resin composition suitable for producing an optical pickup unit.

2. Description of the Related Art

Optical pickups are used for a compact disc and a laser disc. The optical pickup, which condenses a semiconductor laser to a spot having a diameter of several micrometers using a lens and irradiates a disc with the condensed semiconductor laser, reads information recorded on the disc. Generally, the optical pickup includes an optical frame fixing an optical element or the like, an object lens, an actuator part for making an object lens holder follow the movement of an optical disc, and a base frame holding the actuator part and forming an optical path to the optical frame. Optical pickup units made of a resin, such as the optical frame, the actuator part and the base frame, have been mainly studied from the demands for weight reduction and cost reduction.

Among resin materials for producing the optical pickup units, particularly a resin composition containing a liquid crystalline polyester has been studied. This is because the liquid crystalline polyester is excellent in characteristics such as mechanical characteristics, moldability, dimensional accuracy and damping properties. Furthermore, with aiming at obtaining a lightweight optical pickup unit, a liquid crystalline polyester resin composition obtained from a filler having a hollow part (referred to as a hollow filler) and the liquid crystalline polyester have been studied. For example, Japanese Patent Application Laid-Open No. 2005-330468 proposes a resin composition containing a liquid crystalline polyester (wholly aromatic polyester) having specific melt viscosity and an inorganic spherical hollow body (i.e., hollow filler) as well as a glass fiber or talc.

Generally, the resin composition containing the hollow filler has characteristics that the hollow filler is easily broken in a pelletizing process for obtaining the resin composition in a pellet shape or a process for producing (molding) a molded article using the resin composition. Therefore, when a pellet-shaped resin composition containing the hollow filler or a molded article thereof is produced, the production should be done with suppressing the breakage of the hollow filler as much as possible.

In producing liquid crystalline polyester resin compositions proposed so far, the breakage of a hollow filler is suppressed by using a liquid crystalline polyester having relatively low melt viscosity or regulating a pelletizing or molding condition. Techniques for suppressing the breakage of the hollow filler using fillers other than the hollow filler have been hardly studied.

Meanwhile, the production process of the optical pickup has a step in which the optical pickup unit is brought into contact with high temperature solder. Use of higher temperature solder is required from a recent demand for using unleaded solder. The demand for durability (soldering resistance) of the optical pickup unit against the high temperature solder is becoming increasingly strenuous in accordance with the use of the high temperature solder. However, the soldering resistance of the liquid crystalline polyester disclosed in Japanese Patent Application Laid-Open No. 2005-330468 (described above) is hardly sufficient, and it is difficult to correspond to the demand for using the unleaded solder. When the liquid crystalline polyester having high, heat resistance is used for advanced soldering resistance, the melt viscosity of the liquid crystalline polyester generally tends to increase, which disadvantageously promotes the breakage of the hollow filler.

BACKGROUND OF THE INVENTION

Under such circumstances, one of objectives of the present invention is to provide a liquid crystalline polyester resin composition which can sufficiently suppress the breakage of a hollow filler by using a specific filler. Particularly, it is an object of the present invention to provide a liquid crystalline polyester resin composition which can sufficiently suppress the breakage of the hollow filler even when the liquid crystalline polyester having high heat resistance is used.

The present invention provides a liquid crystalline polyester resin composition comprising the following components (A), (B) and (C):

(A) a liquid crystalline polyester;
(B) mica; and
(C) a hollow filler.

In addition, the present invention provides a molded article obtained from the liquid crystalline polyester resin composition.

According to the present invention, it is possible to pelletize or mold the liquid crystalline polyester resin composition containing the hollow filler while sufficiently suppressing the breakage of the hollow filler. In particular, the present invention makes it possible to sufficiently suppress the breakage of the hollow filler even when a liquid crystalline polyester having high heat resistance is used in order to enhance the soldering resistance of the molded article.

The liquid crystalline polyester resin composition of the present invention does not remarkably impair the excellent moldability or mechanical strength of the liquid crystalline polyester. Thereby, the liquid crystalline polyester resin composition is extremely useful as a material for producing an optical pickup unit (optical pickup lens holder or the like) for which such characteristics are required. Furthermore, the liquid crystalline polyester resin composition can also be applied to the production of the optical pickup unit for which thickness reduction and complication of the shape are increasingly required from here on. Therefore, the liquid crystalline polyester resin composition is industrially of great value.

DETAILED DESCRIPTION OF THE PREFERRED EMBODIMENTS

Figure 1:
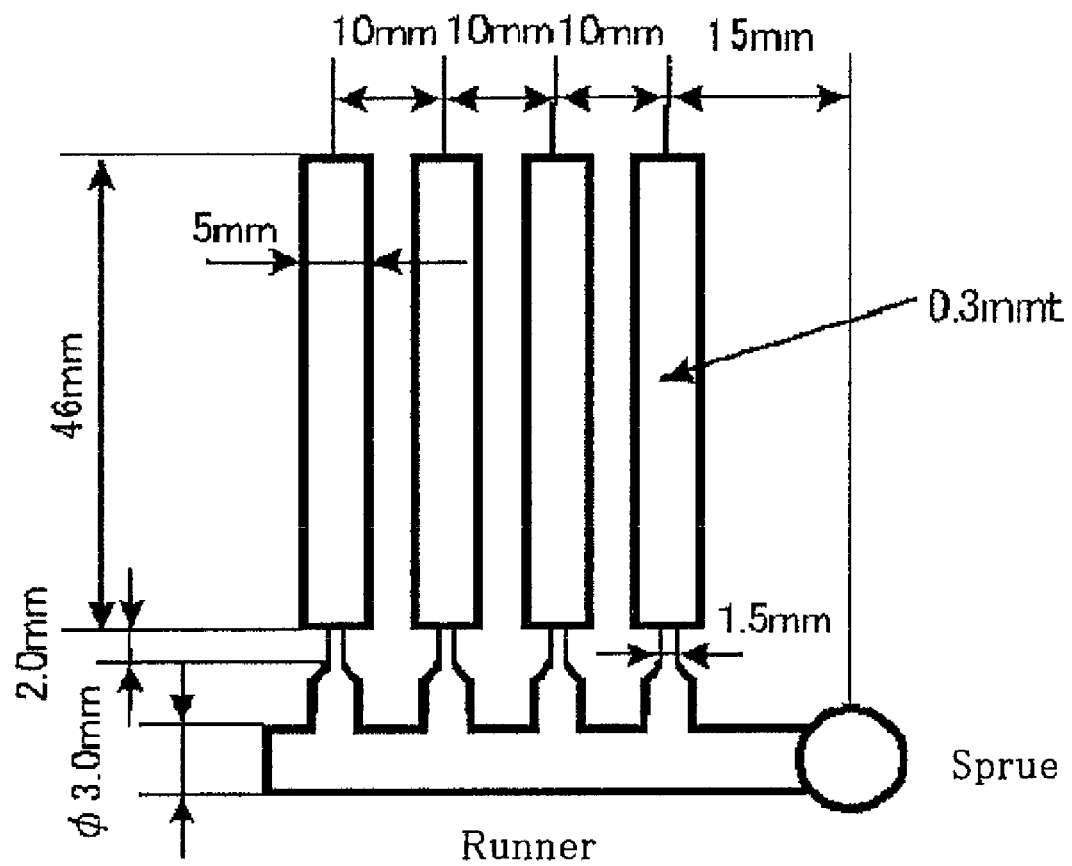
FIG. 1 is a diagram showing a mold used for measuring thin-wall flow length in Examples.

A liquid crystalline polyester resin composition of the present invention comprises the following components (A), (B) and (C):

(A) a liquid crystalline polyester;
(B) mica; and
(C) a hollow filler.

Hereinafter, each of the components (A) to (C) of the liquid crystalline polyester resin composition of the present invention, a method for producing the liquid crystalline polyester resin composition, and a method for producing a molded article using the liquid crystalline polyester resin composition will be sequentially described.

<Component (A): Liquid Crystalline Polyester>

The liquid crystalline polyester used for the component (A) is a polyester referred to as a thermotropic liquid crystalline polymer. The liquid crystalline polyester is suitably obtained by polymerizing an aromatic hydroxycarboxylic acid, an aromatic dicarboxylic acid and an aromatic diol, and forms an anisotropic melt at a temperature of 400° C. or lower.

The liquid crystalline polyester can be more easily produced by partially converting raw material monomers such as an aromatic hydroxycarboxylic acid, an aromatic dicarboxylic acid and an aromatic diol to ester-forming derivatives, and polymerizing the derivatives. Examples of the ester-forming derivatives include the followings. As for ester-forming derivatives of an aromatic hydroxycarboxylic acid and an aromatic dicarboxylic acid, which have a carboxyl group in the molecules, examples thereof include those in which the carboxyl group is converted into a group such as a highly reactive acid halogen group or an acid anhydride group, and those in which the carboxyl group is converted into an ester which generates a polyester in a transesterification reaction. As for the ester-forming derivatives of an aromatic hydroxycarboxylic acid and an aromatic diol, which have a phenolic hydroxyl group in the molecules, examples thereof include those in which the phenolic hydroxyl group is converted into an ester so as to form a polyester in a transesterification reaction. A suitable method for producing a liquid crystalline polyester using such ester-forming derivatives will be described later.

Specific examples of a structural unit constituting the liquid crystalline polyester used for the component (A) will be shown below.

Structural Units Derived from an Aromatic Hydroxycarboxylic Acid:

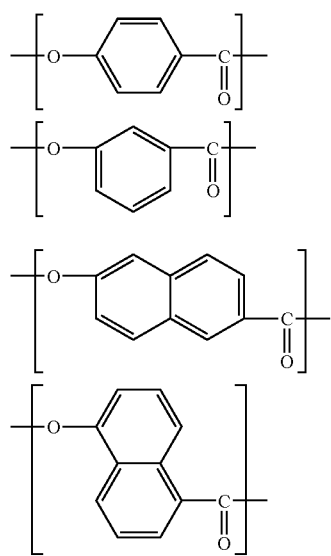

In these structural units, some of the hydrogen atoms in their aromatic rings may be substituted with a substituent selected from a halogen atom, an alkyl group and an aryl group.

Structural units derived from an aromatic dicarboxylic acid:

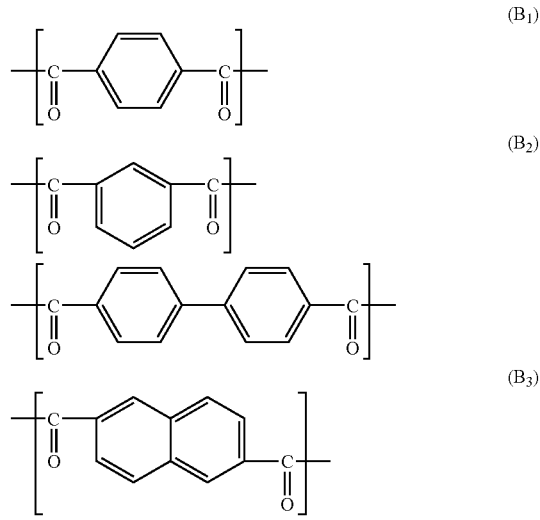

In these structural units, some of the hydrogen atoms in their aromatic rings may be substituted with a substituent selected from a halogen atom, an alkyl group and an aryl group.

Structural units derived from an aromatic diol:

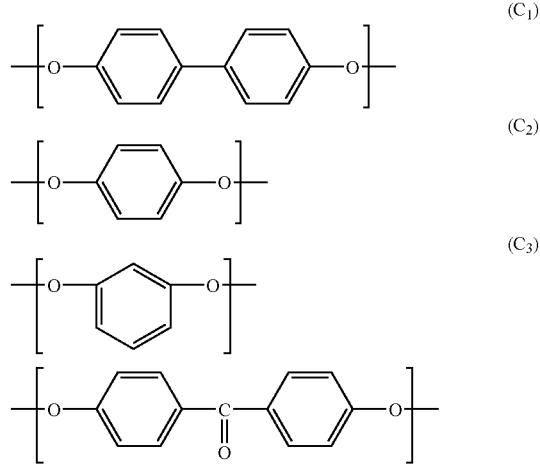

In these structural units, some of the hydrogen atoms in their aromatic rings may be substituted with a substituent selected from a halogen atom, an alkyl group and an aryl group.

The substituent which may be optionally contained in the structural unit will be briefly described. Examples of the halogen atoms include a fluorine atom, a chlorine atom and a bromine atom. Examples of the alkyl group include lower alkyl groups having about 1 to 4 carbons such as a methyl group, an ethyl group and a butyl group. Typical examples of the aryl group include a phenyl group. As described later, the flow starting temperature of the liquid crystalline polyester used for the component (A) used in the present invention is preferably 360° C. or higher. Thereby, it is desirable that the structural unit does not have the substituent in order to obtain the liquid crystalline polyester having such a flow starting temperature.

Suitable combinations of the structural units exemplified above will be described in detail. The combinations of the structural units of the liquid crystalline polyester used for the component (A) are preferably shown by the following combination (a), (b), (c), (d), (e) or (f) (hereinafter, may be referred to as "(a) to (f)").

(a): A combination of a unit ($A_1$), units ($B_1$) and/or ($B_2$), and a unit ($C_1$)
(b): A combination of the units ($A_1$) and ($A_2$)
(c): A combination obtained by partially replacing the unit ($A_1$) with the unit ($A_2$) in the combination (a)
(d): A combination obtained by partially replacing the unit ($B_1$) with a unit ($B_3$) in the combination (a)
(e): A combination obtained by partially replacing the unit ($C_1$) with a unit ($C_3$) in the combination (a)
(f): A combination obtained by adding the units ($B_1$) and ($C_1$) to the combination (b)

In the combinations (a) to (f), the amount of the structural unit ($A_1$) derived from p-hydroxybenzoic acid is preferably 30 mol % or more and more preferably 50 mol % or more based on the total of the whole structural units. Such a mole percentage of ($A_1$) provides the liquid crystalline polyester having an excellent balance of characteristics such as heat resistance and mechanical strength.

In the combinations (a) to (f), the liquid crystalline polyester having a suitable flow starting temperature, that is, a flow starting temperature of 360° C. or higher can be produced by utilizing an increase in the flow starting temperature caused by enhancement of the linearity of the molecular chain of the liquid crystalline polyester. More specifically, in the combination of ($B_1$) and ($B_2$), the unit ($B_1$) enhances the linearity of the liquid crystalline polyester molecule, and the unit ($B_2$) enhances the flexibility of the liquid crystalline polyester molecule (reduces the linearity). Therefore, the flow starting temperature can be regulated by controlling the copolymerization ratio of the units ($B_1$) and ($B_2$).

Among the liquid crystalline polyesters obtained in the combinations described above, examples of preferred liquid crystalline polyester as the component (A) include the liquid crystalline polyester of the combination (a), that is, a liquid crystalline polyester containing the structural unit [($A_1$)] derived from p-hydroxybenzoic acid, the structural unit [($C_1$)] derived from 4,4-dihydroxybiphenyl, and the structural unit derived from terephthalic acid and/or the structural unit derived from isophthalic acid [($B_1$) and/or ($B_2$)].

In the liquid crystalline polyester of the combination (a), the mole ratio of ($C_1$)/($A_1$) is preferably 0.2 or more and 1.0 or less; the mole ratio of [($B_1$)+($B_2$)]/($C_1$) is preferably 0.9 or more and 1.1 or less; and the mole ratio of ($B_2$)/($B_1$) is preferably more than 0 and 1 or less, and more preferably more than 0 and 0.3 or less.

As described above, the flow starting temperature of the liquid crystalline polyester used for the component (A) is preferably 360° C. or higher, more preferably 360 to 410° C., and particularly preferably 370 to 400° C. When the flow starting temperature of the liquid crystalline polyester is within such a range, the heat resistance of the liquid crystalline polyester itself is sufficiently exhibited, and the soldering resistance of the molded article obtained using the liquid crystalline polyester resin composition of the present invention is extremely good. Thereby, the molded article can be obtained at a practical molding temperature. The present invention can satisfactorily suppress the breakage of the hollow filler in pelletizing or molding even when the liquid crystalline polyester (liquid crystalline polyester having high heat resistance) having such a high flow starting temperature is used for the component (A). The flow starting temperature used herein means a temperature at which a melt viscosity becomes 4800 Pa·s (48000 poise) when the liquid crystalline polyester is extruded from a nozzle while being heated at a heating rate of 4° C./min under a load of 9.8 MPa (100 kg/cm²) by using a capillary rheometer to which a dice having an inner diameter of 1 mm and a length of 10 mm is attached. The flow starting temperature is an index which is known in the art for indicating the molecular weight of the liquid crystalline polyester (see, Naoyuki Koide, Liquid-crystalline Polymer Synthesis, Molding, and Application, pages 95 to 105, published by CMC on Jun. 5, 1987).

Next, a method for producing the liquid crystalline polyester as the component (A) will be described.

The liquid crystalline polyester used for the component (A) is preferably produced by a production method that includes an acylating step and a polymerizing step. The acylating step acylates a phenolic hydroxyl group of an aromatic diol and an aromatic hydroxycarboxylic acid with a fatty acid anhydride (acetic anhydride or the like) to produce an acylated compound (an aromatic diol-acylated compound and an aromatic hydroxycarboxylic acid-acylated compound). The polymerizing step polymerizes an acyl group of the obtained acylated compound and a carboxyl group of an acylated compound of an aromatic m dicarboxylic acid and an aromatic hydroxycarboxylic acid so that the acyl group and the carboxyl group cause transesterification to provide the liquid crystalline polyester.

The acylating step and/or the polymerizing step in the method for producing the liquid crystalline polyester may be carried out in the presence of a heterocyclic organic base compound shown below:

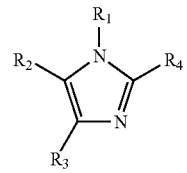

wherein $R_1$ to $R_4$ each independently represent a hydrogen atom, an alkyl group having 1 to 4 carbon atoms, a hydroxymethyl group, a cyano group, a cyanoalkyl group in which an alkyl group has 1 to 4 carbon atoms, a cyanoalkoxy group in which an alkoxy group has 1 to 4 carbon atoms, a carboxyl group, an amino group, an aminoalkyl group having 1 to 4 carbon atoms, an aminoalkoxy group having 1 to 4 carbon atoms, a phenyl group, a benzyl group, a phenylpropyl group, or a formyl group.

Among the heterocyclic organic base compounds represented by the above formula, 1-methylimidazole and/or 1-ethylimidazole are more preferable since they are easily obtained.

The amount of the heterocyclic organic base compound used is preferably 0.005 to 1 part by weight based on the total of 100 parts by weight of the raw material monomers (the aromatic dicarboxylic acid, the aromatic diol and the aromatic hydroxycarboxylic acid) of the liquid crystalline polyester, and more preferably 0.05 to 0.5 part by weight in view of the color tone of the molded article to be obtained and the productivity of the molded article. The heterocyclic organic base compound may be present for a period of time during the acylation reaction and the transesterification reaction. In addition, the heterocyclic organic base compound may be added just before the starting of the acylation reaction or during the acylation reaction. Alternatively, the heterocyclic organic base compound may be added between the acylation reaction and the transesterification reaction. The liquid crystalline polyester thus obtained has an advantage that it exhibits more excellent melt flowability.

The amount of the fatty acid anhydride to be used, such as acetic anhydride, is preferably 1.0 to 1.2 times by mole, more preferably 1.0 to 1.15 times by mole, still more preferably 1.03 to 1.12 times by mole, and particularly preferably 1.05 to 1.1 times by mole to the total molar amount of the phenolic hydroxyl groups which are present in the aromatic diol and/or the aromatic hydroxycarboxylic acid in consideration of the amount of these raw material monomers to be used.

The acylation reaction of the aromatic diol and the aromatic hydroxycarboxylic acid in the acylating step is preferably carried out at 130 to 180° C. for 30 minutes to 20 hours, and more preferably carried out at 140 to 160° C. for 1 to 5 hours.

Next, there will be described a polymerizing step of subjecting the acyl group of the acylated compound (the acylated compound of the aromatic diol and the acylated compound of the aromatic hydroxycarboxylic acid) obtained in the acylating step and the carboxyl group of the acylated compound of the aromatic dicarboxylic acid and the aromatic hydroxycarboxylic acid to transesterification (transesterification reaction) to polymerize the acylated compounds. The aromatic dicarboxylic acid may be present in a reaction system during the acylating step. In other words, the aromatic diol, the aromatic hydroxycarboxylic acid and the aromatic dicarboxylic acid may be present in the same reaction system during the acylating step. This is because the carboxyl group present in the aromatic dicarboxylic acid and the substituent which may be optionally substituted are not influenced by the fatty acid anhydride at all. Therefore, the same reactor vessel may be fed with the aromatic diol, the aromatic hydroxycarboxylic acid and the aromatic dicarboxylic acid to be acylated with the fatty acid anhydride. Alternatively, the aromatic diol and the aromatic hydroxycarboxylic acid may be previously fed into the reactor vessel and acylated with the fatty acid anhydride, and the reactor vessel may be then fed with the aromatic dicarboxylic acid. The former method is more preferable in view of simplicity of the operation.

The polymerization caused by the transesterification reaction is carried out while heating the reaction system preferably at a rate of 0.1 to 50° C./min in the range of 130 to 400° C., and more preferably at a rate of 0.3 to 5° C./min in the range of 150 to 350° C.

It is preferable that a fatty acid (acetic acid or the like) by-produced and an unreacted fatty acid anhydride (acetic anhydride or the like) be evaporated and distilled away to the outside of the system in order to shift equilibrium when the transesterification reaction is carried out. The raw material monomer or the like evaporated or sublimated with the fatty acid can be condensed or reverse-sublimated to be returned to the reactor vessel by refluxing a part of the fatty acid distilled away and returning the part to the reactor vessel.

The acylation reaction and the transesterification reaction may be carried out by using a batch device or a continuous device. The liquid crystalline polyester used for the present invention can be obtained by using either of the reaction devices (reactor vessels).

The obtained liquid crystalline polyester may be cooled and taken out after the polymerizing step and pulverized to be made into a powder shape. In addition, the liquid crystalline polyester made into a powder shape may be pelletized. Thereby, the obtained solid (powder or pellet) liquid crystalline polyester can be further heated to be macromolecularized. The macromolecularization of the liquid crystalline polyester is referred to as solid phase polymerization in the art. The solid phase polymerization is particularly effective for the macromolecularization of the liquid crystalline polyester. The macromolecularization enables the liquid crystalline polyester having the suitable flow starting temperature to be easily obtained. As the reaction condition of the solid phase polymerization, there is adopted a method of heat-treating the solid liquid crystalline polyester under an inactive gas (nitrogen or the like) atmosphere or reduced pressure for 1 to 20 hours, or the like. In this case, examples of a device used for heat treatment include a known drier, reactor vessel, inert oven, mixer and electric furnace.

<Component (B): Mica>

Mica used for the component (B) can be made of an aluminosilicate containing an alkaline metal. In the present invention, mica products commercially available as fillers to be added to resins can be utilized. Among these commercially available mica products, a mica product produced from so-called muscovite is preferably used. In the market, a mica produced from muscovite and a mica produced from phlogopite are commercially available. The present inventors have found that the use of the latter mica tends to deteriorate the molding processability of the liquid crystalline polyester resin composition of the present invention and, when obtaining a molded article having a thin-walled part, tends to promote the warpage generation of the molded article.

The volume average particle diameter D50 obtained by laser diffraction-type particle size distribution measurement of the mica used for the component (B) is preferably 40 μm or less, and more preferably 25 μm or less. When the volume average particle diameter D50 is larger than 40 μm, the melt flowability of the liquid crystalline polyester resin composition of the present invention tends to deteriorate, and it may become difficult to obtain a molded article having a thin-walled part.

The specific surface area of the mica used for the component (B) as measured by the BET method is preferably 6 m$^2$/g or less, and more preferably 4 m$^2$/g or less. When the specific surface area is larger than 6 m$^2$/g, the amount of water adhered to the surface of the mica increases, and the adhered water may easily produce hydrolysis of the liquid crystalline polyester. The obtained molded article may have a decreased strength or may have apparent abnormalities such as swelling caused by a liquid crystalline polyester decomposition product. The amount of the adhered water used herein is obtained by a heating dry type moisture meter. The amount of the adhered water on the mica used for the component (B) is preferably 0.3% by weight or less, and more preferably 0.2% by weight or less.

Examples of the commercially available mica product which satisfies the suitable volume average particle diameter D50 and the specific surface area include "AB25S" from Yamaguchi Mica Co., Ltd.

<Component (C): Hollow Filler>

The hollow filler used for the component (C) is required for the weight reduction of the molded article to be obtained using the liquid crystalline polyester resin composition of the present invention. The weight reduction can enhance the focusing sensitivity of the optical pickup lens holder when the optical pickup lens holder is obtained using, for example, the liquid crystalline polyester resin composition of the present invention.

A shirasu balloon, a glass balloon, a ceramic balloon, an organic resin balloon, fullerene or the like can be used for the hollow filler. The glass balloon is particularly preferable in view of ready availability and hard breakage.

The average particle diameter of the hollow filler is preferably 1 to 200 μm, more preferably 5 to 100 μm, and still more preferably 10 to 50 μm, and particularly preferably 10 to 30 μm. When the average particle diameter of the hollow filler is too large, the strength of the hollow filler tends to be reduced, and the hollow filler itself is easily broken. On the other hand, when the average particle diameter of the hollow filler is too small, the surface area increases, and the hollow filler easily absorbs moisture. This may promote hydrolysis of the liquid crystalline polyester in pelletizing. The strength of the hollow filler is preferably 1,000 kg/cm$^2$ or more, more preferably 1,000 to 1800 kg/cm$^2$, and still more preferably 1200 to 1800 kg/cm$^2$.

The volume hollow rate of the hollow filler is preferably 40 to 80%, and more preferably 60 to 80%. The volume hollow rate used herein is an approximate value calculated by the following formula:

$$\text{(Volume Hollow Rate)}=100\times\{(1-(\sigma_1/\sigma_2)\}$$

wherein $\sigma_1$ represents the true specific gravity of the hollow filler, and $\sigma_2$ represents the specific gravity of a material constituting the hollow filler.

Examples of the hollow filler which satisfies the suitable average particle diameter, strength and volume hollow rate include "Glass Bubbles S60HS" (strength: 1260 kg/cm$^2$, average particle diameter: 27 μm, volume hollow rate: 76%) made by Sumitomo 3M Ltd.

<Other Additive Agents>

As described above, the liquid crystalline polyester resin composition of the present invention contains the components (A) to (C) as indispensable components. However, the liquid crystalline polyester resin can contain resins other than the component (A), for example, one or two kinds or more of thermoplastic resins such as polyamide, polyester, polyphenylene sulphide, polyether ketone, polycarbonate, polyphenylene ether and a modified product thereof, polysulphone, polyethersulphone and polyetherimide, and thermosetting resins such as a phenol resin, an epoxy resin and a polyimide resin within a range in which the object of the present invention will not be impaired.

Similarly, the liquid crystalline polyester resin composition can contain fillers and additive agents other than the component (B) and the component (C) within a range in which the object of the present invention will not be impaired. The liquid crystalline polyester resin composition may contain, for example, fibrous inorganic fillers such as glass fibers, carbon fibers, wollastonite, aluminum borate whiskers, potassium titanate whiskers, silica alumina fibers, and alumina fibers. These may be used alone or two or more kinds of them can be used in combination. Examples of spherical inorganic fillers include glass beads and silica beads. The liquid crystalline polyester resin composition may contain additive agents including mold release improvers such as a fluorine resin and metal soap; colorants such as a dye and a pigment; antioxidants; heat stabilizers; ultraviolet absorbers; antistatic agents; and surfactants, which are conventionally used in the art. Additive agents having an external lubricant effect, such as higher fatty acids, higher fatty acid esters, metal salts of higher fatty acids and fluorocarbon-based surfactants may be used.

<Method for Producing Liquid Crystalline Polyester Resin Composition>

The liquid crystalline polyester resin composition of the present invention contains the components (A) to (C) and can also contain resins other than the component (A), and fillers and additive agents other than the component (B) and the component (C), if needed. The blending percentages of the components (A) to (C) can be suitably regulated in consideration of the desired specific gravity or the like of the molded article to be obtained. However, the amount of the component (B) is preferably 1 to 20% by weight and more preferably 5 to 20% by weight based on the total weight of the components (A) to (C). On the other hand, the amount of the component (C) is preferably 3 to 25% by weight and more preferably 4 to 20% by weight based on the total weight of the components (A) to (C). When the blending percentage of the component (B) is within the above range, there is an advantage that the decomposition of the liquid crystalline polyester is sufficiently prevented to prevent the occurrence of the apparent abnormities. When the blending percentage of the component (C) is within the above range, the breakage of the hollow filler is further suppressed by the synergistic effect of the component (B), and the specific gravity is sufficiently reduced when the molded article is used as an optical pickup unit. When injection molding is carried out in order to obtain a molded article, the above range of the blending percentage has an advantage that the orientation degree of the liquid crystalline polyester by shear stress can be reduced to increase the weld strength of the molded article to be obtained.

The components (A) to (C) for obtaining the liquid crystalline polyester resin composition of the present invention can be mixed by various known means. Examples thereof include a method of respectively supplying the components (A) to (C), and the additive agents and the resins if needed to a melt mixer separately, and mixing the components; and a method of preliminarily mixing these rawmaterial components using a mortar, a Henschel mixer, a ball mill or a ribbon blender, and supplying the mixture to a melt mixer.

Among such methods for producing the liquid crystalline polyester resin composition, when a liquid crystalline polyester having the flow starting temperature of 360° C. or higher is used as the component (A), in order to further prevent the breakage of the hollow filler as the component (C), for example, it is preferred to mix the component (C) at a time point where the liquid crystalline polyester (A) and the component (B) have been sufficiently melted and mixed in the melt mixer, and the melt viscosity of the mixture has become the lowest. Therefore, when a melt extrusion kneader is used, there is adopted a melt kneading method of supplying the component (A) and the component (B) from the upstream side and supplying the component (C) from the midstream (the downstream side) of the melt kneader.

<Molding of Liquid Crystalline Polyester Resin Composition and Optical Pickup Lens Holder>

A molded article can be obtained by melting and molding the liquid crystalline polyester resin composition of the present invention thus obtained. As the molding means, injection molding is particularly preferable in that a molded article having a thin-walled part is easily obtained. The liquid crystalline polyester resin composition of the present invention is particularly suitable for a material for producing an optical pickup unit, particularly, an optical pickup lens holder.

The injection molding which is a suitable molding method will be further described in detail. The molding temperature is preferably set to a temperature higher by about 10 to 80° C. than the flow starting temperature of the liquid crystalline polyester which is the component (A). When the molding temperature is within this range, the liquid crystalline polyester resin composition of the present invention can exhibit excellent melt flowability, and can exhibit good moldability even in the optical pickup lens holder having a thin-walled part and the optical pickup lens holder having a complicated shape. Weight reduction and cost reduction are strongly required for such an optical pickup lens holder and the thickness thereof tends to be increasingly reduced. According to the liquid crystalline polyester resin composition of the present invention, an optical pickup lens holder having a thin-walled part having a thickness of 0.1 mm to 1.5 mm can also be easily molded. Even when an optical pickup lens holder having a thin-walled part having a thickness of 0.05 mm to 0.15 mm is molded in molding an optical pickup lens holder having a comparatively short flow length, the optical pickup lens holder can be molded with good dimensional accuracy. The molded article thus obtained has an excellent torsional elastic modulus and mechanical strength such as impact strength without impairing the excellent heat resistance of the liquid crystalline polyester. Furthermore, the molded article obtained from the liquid crystalline polyester resin composition of the present invention, which is practical as the optical pickup unit, has low specific gravity. For example, a molded article having a low specific gravity obtained based on ASTM D792 (method A) of 1.15 to 1.55 can be obtained. The torsional elastic modulus of the molded article is also sufficient. Therefore, the molded article is particularly preferable as the optical pickup unit. The blending percentages of the component (B) and the component (C) based on the total weight of the component (A), particularly the blending percentage of the component (C) may be suitably adjusted in order to set the specific gravity of the molded article within the above range.

As described above, the liquid crystalline polyester resin composition of the present invention is extremely useful as the material for producing the optical pickup unit, particularly, as the material for producing the optical pickup lens holder for which thickness reduction and complication of the shape are required, from here on. An optical pickup lens member (optical pickup lens holder) obtained using the liquid crystalline polyester resin composition of the present invention can improve reading performance of a signal reading device of a digital disc driving device.

The invention being thus described, it will be apparent that the same may be varied in many ways. Such variations are to be regarded as within the spirit and scope of the invention, and all such modifications as would be apparent to one skilled in the art are intended to be within the scope of the following claims.

The entire disclosure of the Japanese Patent Application No. 2009-57574 filed on Mar. 11, 2009 and the Japanese Patent Application No. 2009-153518 filed on Jun. 29, 2009, both including specification, claims and summary, are incorporated herein by reference in their entirety.

EXAMPLES

The present invention is described in more detail by following Examples, which should not be construed as a limitation upon the scope of the present invention. Evaluation methods are as follows.
(1) Specific Gravity
A liquid crystalline polyester resin composition was molded into dumbbell-type test pieces [JIS K7113 (1/2)] (thickness: 0.5 mm) under molding conditions of a cylinder temperature of 350° C., a mold temperature of 130° C. and an injection rate of 60% using an injection molding machine ("PS40E1ASE" made by Nissei Plastic Industrial Co., Ltd.). The specific gravity of each of the obtained test pieces was measured in accordance with ASTM D792 (method A).
(2) Izod Impact Strength
A liquid crystalline polyester resin composition was molded into test pieces having a length of 64 mm, a width of 12.7 mm and a thickness of 6.4 mm under molding conditions of a cylinder temperature of 350° C., a mold temperature of 130° C. and an injection rate of 60% using an injection molding machine ("PS40E1ASE" made by Nissei Plastic Industrial Co., Ltd.). The Izod impact strength of each of the obtained test pieces was measured in accordance with ASTM D256.
(3) Torsional Elastic Modulus
A liquid crystalline polyester resin composition was molded into dumbbell-type test pieces [JIS K7113 (1/2)] (thickness: 0.5 mm) under molding conditions of a cylinder temperature of 400° C., a mold temperature of 130° C. and an injection rate of 80% using an injection molding machine ("PS40E1ASE" made by Nissei Plastic Industrial Co., Ltd.). The obtained test pieces were cut into strips (5 mm×35 mm), and the storage elastic modulus (torsional elastic modulus) of each of the strips was measured at 23° C. at 80 Hz using "Dynamic Analyzer RDA II" made by Rheometrics.
(4) Soldering Resistance
A liquid crystalline polyester resin composition was molded into dumbbell-type test pieces [JIS K7113 (1/2)] (thickness: 1.2 mm) under molding conditions of a cylinder temperature of 350° C., a mold temperature of 130° C. and an injection rate of 60% using an injection molding machine ("PS40E1ASE" made by Nissei Plastic Industrial Co., Ltd.). Five of the obtained test pieces were immersed in a solder bath heated to a predetermined temperature for 60 seconds. The test pieces taken out were observed for the occurrence of warpage. The temperature at which the warpage occurred was defined as a solder heat resistance temperature.
(5) Thin-Wall Flow Length
A liquid crystalline polyester resin composition was molded into test pieces with a mold (0.3 mmt) shown in FIG. 1 under molding conditions of a cylinder temperature of 390° C., 400° C. or 410° C., a mold temperature of 130° C. and an injection rate of 60% using an injection molding machine ("PS10E1ASE" made by Nissei Plastic Industrial Co., Ltd.). Each of the lengths at the 4-cavity parts per one (1) piece was measured. The average length of these measured lengths (4 parts per 1 piece×5 pieces) was defined as a thin-wall flow length.

Production Example 1

A reactor vessel equipped with a stirrer, a torque meter, a nitrogen gas inlet, a thermometer, and a reflux condenser was fed with 830.7 g (5.0 mol) of p-hydroxybenzoic acid, 465.5 g (2.5 mol) of 4,4'-dihydroxybiphenyl, 394.6 g (2.375 mol) of terephthalic acid, 20.8 g (0.125 mol) of isophthalic acid, and 1153 g (11.0 mol) of acetic anhydride. After the inside of the reactor vessel was sufficiently replaced with a nitrogen gas, the reactor vessel was heated to 150° C. over 15 minutes under a nitrogen gas flow and kept at the temperature, and refluxed for 180 minutes. Thereafter, while distilling by-produced acetic acid and unreacted acetic anhydride away, the temperature was increased to 320° C. over 2 hours and 50 minutes. The reaction was deemed as complete at the moment the torque increase was observed and the contents were taken out. The obtained contents were cooled to room temperature and pulverized by a coarse pulverizer to obtain a powder. The powder was heated under a nitrogen atmosphere from room temperature to 250° C. over 1 hour and from 250° C. to 320° C. over 5 hours, and kept at 320° C. for 3 hours to carry out solid-phase polymerization. The polymerized product was cooled to obtain a liquid crystalline polyester. The obtained liquid crystalline polyester was named as an LCP 1. The flow starting temperature of the LCP 1 was 385° C. The mole ratio of the structural units of the LCP 1 was as follows:

$(C_1)/(A_1)=0.5; [(B_1)+(B_2)]/(C_1)=1;$ and
$(B_2)/(B_1)=0.05.$

Production Example 2

A reactor vessel equipped with a stirrer, a torque meter, a nitrogen gas inlet, a thermometer, and a reflux condenser was fed with 994.5 g (7.2 mol) of p-hydroxybenzoic acid, 446.9 g (2.4 mol) of 4,4'-dihydroxybiphenyl, 299.0 g (1.8 mol) of terephthalic acid, 99.7 g (0.6 mol) of isophthalic acid, and 1347.6 g (13.2 mol) of acetic anhydride. After the inside of the reactor vessel was sufficiently replaced with a nitrogen gas, the reactor vessel was heated to 150° C. over 30 minutes under a nitrogen gas flow and kept at the temperature, and refluxed for 30 minutes. Thereafter, while distilling by-produced acetic acid and unreacted acetic anhydride away, the temperature was increased to 320° C. over 2 hours and 50 minutes. The reaction was deemed as complete at the moment the torque increase was observed and the contents were taken out. The obtained contents were cooled to room temperature and pulverized by a coarse pulverizer to obtain a powder. The powder was heated under a nitrogen atmosphere from room temperature to 250° C. over 1 hour and from 250° C. to 285° C. over 5 hours, and kept at 285° C. for 3 hours to carryout solid-phase polymerization. The polymerized product was cooled to obtain a liquid crystalline polyester. The obtained liquid crystalline polyester was named as an LCP 2. The flow starting temperature of the LCP 2 was 327° C. The mole ratio of the structural units of the LCP 2 was as follows:

$(C_1)/(A_1)=0.3; [(B_1)+(B_2)]/(C_1)=1;$ and $(B_2)/(B_1)=0.3.$

Examples 1 to 9 and Comparative Examples 1 to 6

Liquid crystalline polyesters and fillers were blended according to blending percentages shown in Table 1. They were then pelletized using abiaxial extruder ("PCM-30" made by Ikegai Iron Works, Ltd.) and a water seal vacuum pump ("SW-25" made by Shinko Seiki Co., Ltd.) while deaerating at a cylinder temperature of 390° C. using a vacuum vent to obtain liquid crystalline polyester resin compositions in a pellet shape.

The obtained liquid crystalline polyester resin compositions were molded under the above molding conditions to obtain molded articles. The specific gravity, Izod impact strength, torsional elastic modulus and soldering resistance of each of the molded articles were measured. In Examples 1-3, the thin-wall flow length of each of the molded articles were also measured. The results are shown in Table 1. The fillers used are as follows.
Glass Fiber: "CS03JAPX-1" made by Owens Corning, Inc.
Mica 1: "AB-25S" made by Yamaguchi Mica Co., Ltd.
Mica 2: "AB-21S" made by Yamaguchi Mica Co., Ltd.
Mica 3: "AB-41S" made by Yamaguchi Mica Co., Ltd.
Hollow Filler: "Glass Bubbles S60HS" made by Sumitomo 3M Ltd.

The volume average particle diameter D50 of each of the Micas was measured using a laser diffraction-type particle size distribution measuring device ("Mastersizer 2000" made by Sysmex Corp.). The specific surface area of each of the Micas was measured based on ASTM D792 using a BET specific surface area measurement device ("Hmmodel-1208" made by Mountech Co., Ltd.). Also, the adhered water on each of the Micas was measured using a heating dry type moisture meter (A&D Company, Limited). The measurement results are shown as follows:

Mica 1
  The volume average particle diameter D50: 21 μm
  The specific surface area: 4 m$^2$/g.
  The amount of the adhered water: 0.21% by weight
Mica 2
  The volume average particle diameter D50: 19 μm
  The specific surface area: 11 m$^2$/g.
  The amount of the adhered water: 0.50% by weight
Mica 3
  The volume average particle diameter D50: 47 μm
  The specific surface area: 3 m$^2$/g.
  The amount of the adhered water: 0.20% by weight

TABLE 1

|  | Example 1 | Example 2 | Example 3 | Comparative Example 1 | Example 4 | Example 5 | Example 6 | Comparative Example 2 |
|---|---|---|---|---|---|---|---|---|
| LCP 1 (% by weight) | 75 | 75 | 75 | 75 | 75 | 75 | 75 | 75 |
| LCP 2 (% by weight) | — | — | — | — | — | — | — | — |
| Mica 1 (% by weight) | 20 | — | — | — | 15 | 10 | — | — |
| Mica 2 (% by weight) | — | 20 | — | — | — | — | 10 | — |
| Mica 3 (% by weight) | — | — | 20 | — | — | — | — | — |
| Glass fiber (% by weight) | — | — | — | 20 | — | — | — | 10 |
| Hollow filler (% by weight) | 5 | 5 | 5 | 5 | 10 | 15 | 15 | 15 |
| Specific gravity | 1.48 | 1.46 | 1.46 | 1.51 | 1.37 | 1.32 | 1.28 | 1.38 |
| Izod impact strength (MPa) | 355 | 180 | 346 | 341 | 341 | 325 | 239 | 281 |
| Torsional elastic modulus (GPa) | 3.5 | 3.0 | 2.8 | 2.2 | 2.7 | 2.2 | 2.0 | 2.1 |

TABLE 1-continued

| | | | | | | | | |
|---|---|---|---|---|---|---|---|---|
| Soldering resistance (° C.) | 345 | 340 | 340 | 340 | 345 | 345 | 340 | 341 |
| Thin-wall flow length (mm/390° C.) | 13 | 14 | 6 | — | — | — | — | — |
| Thin-wall flow length (mm/400° C.) | 20 | 21 | 13 | — | — | — | — | — |
| Thin-wall flow length (mm/410° C.) | 27 | 29 | 21 | — | — | — | — | — |

| | Example 7 | Example 8 | Example 9 | Comparative Example 3 | Comparative Example 4 | Comparative Example 5 | Comparative Example 6 |
|---|---|---|---|---|---|---|---|
| LCP 1 (% by weight) | — | 75 | 65 | 75 | 75 | 75 | 75 |
| LCP 2 (% by weight) | 75 | — | — | — | — | — | — |
| Mica 1 (% by weight) | 10 | 5 | 20 | 25 | 15 | 10 | — |
| Mica 2 (% by weight) | — | — | — | — | — | — | — |
| Mica 3 (% by weight) | — | — | — | — | — | — | — |
| Glass fiber (% by weight) | — | — | — | — | 10 | 15 | 25 |
| Hollow filler (% by weight) | 15 | 20 | 15 | — | — | — | — |
| Specific gravity | 1.29 | 1.21 | 1.42 | 1.58 | 1.58 | 1.57 | 1.56 |
| Izod impact strength (MPa) | 365 | 288 | 337 | 375 | 368 | 372 | 380 |
| Torsional elastic modulus (GPa) | 2.1 | 1.8 | 2.8 | 4.0 | 2.9 | 2.8 | 2.2 |
| Soldering resistance (° C.) | 300 | 335 | 340 | 350 | 345 | 340 | 353 |
| Thin-wall flow length (mm/390° C.) | — | — | — | — | — | — | — |
| Thin-wall flow length (mm/400° C.) | — | — | — | — | — | — | — |
| Thin-wall flow length (mm/410° C.) | — | — | — | — | — | — | — |

In both Examples 1-3 and Comparative Example 1, 75% by weight of the LCP 1 and 5% by weight of the hollow filler were used. Examples 1-3 are different from Comparative Example 1 only in that the remaining 20% by weight was the micas or the glass fiber. The molded articles obtained in Examples 1-3 had a lower specific gravity than that of Comparative Example 1. That is, the articles of Examples 1-3 were excellent in the lightweight property. In both Examples 5-6 and Comparative Example 2, 75% by weight of the LCP 1 and 15% by weight of the hollow filler were used. Examples 5-6 are different from Comparative Example 2 only in that the remaining 10% by weight was the micas or the glass fiber. Due to such a difference, the molded articles obtained in Examples 5-6 had lower specific gravities than that of Comparative Example 2. That is, the articles of Examples 5-6 were excellent in the lightweight property. These results are considered to be based on the fact that use of the mica effectively suppresses the breakage of the hollow filler as compared to the use of the glass fiber. The results of Comparative Examples 3-6 show that the mica exhibits a lower specific gravity reduction effect than the glass fiber does in the absence of the hollow filler.

In both Examples 1-3 and Comparative Example 1, 75% by weight of the LCP 1, 20% by weight of the micas and 5% by weight of the hollow filler were used. Examples 1-3 are different from one another only in that the kind of micas used was different. Due to such a difference, the molded articles obtained in Examples 1-2 (using the mica with 40 μm or less of the volume average particle diameter) had a higher thin-wall flow length than the molded article obtained in Example 3 (using the mica with more than 40 μm of the volume average particle diameter). That is, the articles of Examples 1-2 were superior to that of Example 3 in the melt flowability. On the other hand, the molded articles obtained in Examples 1 and 3 (using the mica with 6 m$^2$/g or less of the specific surface area) had higher izod impact strengths than the molded article obtained in Example 2 (using the mica with more than 6 m$^2$/g of the specific surface area). In Examples 5-6, 75% by weight of the LCP 1, 10% by weight of the micas and 15% by weight of the hollow filler were used. Examples 5-6 are different from one another only in that the kind of micas used was different. Due to such a difference, the molded article obtained in Example 5 (using the mica with 6 m$^2$/g or less of the specific surface area) had a higher izod impact strength than the molded article obtained in Example 6 (using the mica with more than 6 m$^2$/g of the specific surface area).

What is claimed is:

1. A liquid crystalline polyester resin composition comprising the following components (A), (B) and (C):
   (A) a liquid crystalline polyester;
   (B) mica; and
   (C) a hollow filler having an average particle diameter of 1 to 200 μm.

2. The liquid crystalline polyester resin composition according to claim 1, wherein the content of the component (B) is 1 to 20% by weight and the content of the component (C) is 3 to 25% by weight based on the total weight of the component (A), the component (B) and the component (C).

3. The liquid crystalline polyester resin composition according to claim 1, wherein the component (A) has a flow starting temperature of 360° C. or higher.

4. The liquid crystalline polyester resin composition according to claim 1, wherein the component (B) has a volume average particle diameter of 40 µm or less.

5. The liquid crystalline polyester resin composition according to claim 1, wherein the component (B) has a specific surface area of 6 m2/g or less.

6. A molded article obtained by molding the liquid crystalline polyester resin composition according to claim 1.

7. The molded article according to claim 6, wherein the molded article has a specific gravity of from 1.15 to 1.55 measured by a method A in ASTM D792.

* * * * *